United States Patent Office 3,507,788
Patented Apr. 21, 1970

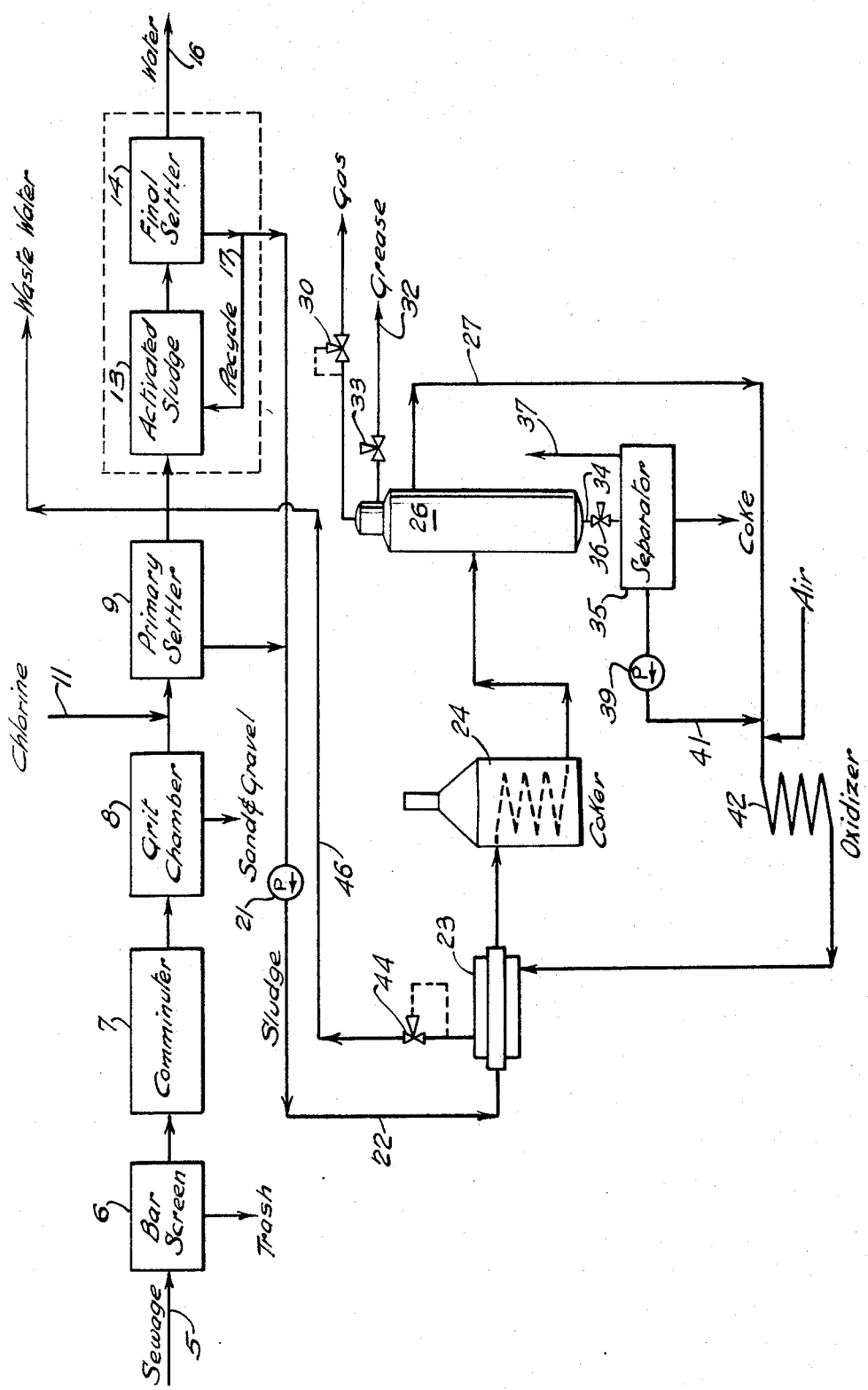

3,507,788
TREATMENT OF SEWAGE
Edward L. Cole, Fishkill, and Howard V. Hess, Glenham, N.Y., assignors to Texaco Inc., New York, N.Y., a corporation of Delaware
Filed Nov. 29, 1968, Ser. No. 780,080
Int. Cl. C02b 1/02
U.S. Cl. 210—63         5 Claims

ABSTRACT OF THE DISCLOSURE

Process for treatment of biological sewage wastes for reduction in chemical oxygen demand (COD) wherein aqueous sewage is heated in the absence of free oxygen to a temperature in the range of 400 to 700° F. under sufficient pressure to prevent vaporation of water and form non-septic coke which is separated from the treated sewage aqueous liquid effluent and the aqueous liquid effluent thereafter subjected to oxidation with air at a temperature above about 450° F. under sufficient pressure to prevent vaporization of water to yield an aqueous liquid effluent of low COD suitable for disposal in lakes or streams without serious water pollution.

---

This invention relates to a process for the treatment of biological sewage wastes.

The process of this invention effects removal of organic matter from sewage, e.g. raw or predigested industrial or municipal sewage, by carbonizing water-soluble and water-insoluble organic matter with heat under elevated pressure and in the absence of free oxygen to form solid coke, separating coke from the treated waste water, and subjecting the treated waste water to oxidation with air at an elevated temperature and pressure to produce non-septic solid coke suitable as fertilizer or fill and an aqueous effluent of low chemical oxygen demand (COD). In one of its more specific aspects, the process of this invention comprises heating municipal sewage concentrate from a primary or secondary sewage treating system to a temperature in the range of 400 to 700° F. under a pressure in the range of 300 to 3200 p.s.i.g. for a period of 0.5 minute to two hours to form a water-insoluble solid coke which is separated from an aqueous liquid effluent of reduced COD and the aqueous liquid effluent thereafter subjected to oxidation with air under substantially the same pressure and temperature conditions to yield an aqueous effluent of low COD.

The term "coke" is used herein in its broad sense to denote a water-insoluble carbonized solid residue of substantially reduced hydroxyl and carboxyl group contents as compared with the organic material in the raw sewage feed to the process.

Recent legislation under Federal and State programs to reduce water pollution renders many present plant installations obsolete or inadequate. Such legislation also restricts disposal of industrial wastes, such as biological sludges from chemical and pharmaceutical plants and petroleum refineries. In a number of older municipal sewage plants, only primary sewage treatment is employed. Primary treatment usually consists of removing trash and readily separable inorganic matter from the raw sewage; adding chemicals, such as chlorine and lime; separating organic sludge, and discharging effluent waste water, often directly into lakes or streams.

The high chemical oxygen demand (COD) of biological sludges makes them highly undesirable constituents in inland waters. Solid residues separated from the sludge are generally unsuited for use directly as fertilizers, land fill, or the like. A number of secondary and tertiary processes have been developed for treatment of such sludges to reduce the volume of solids remaining for disposal and to render them non-septic. Among such treatments are the wet air oxidation and the activated sludge digestion processes. In the activated sludge processes, organic sludge is subjected to anaerobic or aerobic bacterial action, or both. In wet air oxidation processes, an aqueous slurry of sludge is subjected to oxidation with air at elevated temperature and pressure. Both processes are effective methods for treatment of biological sludges but are relatively costly.

The primary object of this invention is to provide an economical and efficient method for treatment of biological sludges. The process of the subject invention has a number of advantages over existing methods of treatment. Such advantages will be apparent from the following detailed description of the process.

The process of this invention will be better understood by reference to the accompanying figure illustrating diagrammatically a preferred embodiment of the present invention as applied to the treatment of municipal sewage:

With reference to the figure, the block diagram at the upper part of the figure represents conventional processing steps and equipment for sewage treatment. Sewage entering the system from line 5 is passed first through bar screen 6 for the removal of trash, such as large pieces of wood, stone, metal and the like. Following the trash removal in the bar screen 6, the raw sewage is passed to comminuter 7 where the particle size of suspended solids passing the bar screen is reduced. From comminuter 7, the sewage passes to grit chamber 8 where sand, gravel, glass, small particles of metal and the like are permitted to settle from the comminuted sewage. Following removal of sand and gravel in grit chamber 8 the sewage is passed to primary settler 9. If desired, chlorine from line 11 may be added to the sewage entering the primary settler.

In many existing sewage plants, waste water from the primary settler is discharged through line 12 into rivers, lakes or drainage fields directly from the primary settler or after filtration to remove suspended solids. Secondary treatment, such as an activated sludge process 13, is employed also in the treatment of municapal sewage in a number of existing installations. In such cases, sludge is removed from the waste water in final settler 14 and the waste water discharged through line 16 to a drainage field, pond, river or lake. Some of the sludge from the final settler is recycled to the activated sludge process through line 17 to maintain the bacterial activity at a high level. It is to be understood that the processes for treatment of sewage as outlined above represent conventional practices and are not to be construed, per se, as part of the subject invention.

In the preferred embodiment of the present invention, sludge is withdrawn from the primary settler 9, the final settler 14, or both, and passed by pump 21 through line 22 and heat exchanger 23 into a tubular heater or coker 24 for removal of suspended and dissolved organic materials as described more fully hereinafter.

In this specific example, the sludge is preheated in heat exchanger 23 by indirect heat exchange with hot recycle liquor described hereinafter and then passed into a fired tubular heater 24 wherein the temperature of the sludge is raised to the desired coking temperature in the range of 400 to 700° F. at a pressure in the range of 300 to 3500 p.s.i.g. sufficient to prevent vaporization of water. The fired heater 24 is suitably a tubular heater of the type commonly used in the processing of petroleum. The hot sludge is discharged from the heater into a coking drum 26 which is in the form of a large pressure vessel suitable for holding the heated sludge at the desired processing temperature and pressure, e.g. 500° F. and 825 p.s.i.g., for a period of 10 minutes to 1 hour. In the coking drum, both water soluble and water insoluble organic components of the sludge are converted to a carbonized solid or coke which is discharged from the lower part of coking drum through line 27

During the coking process, combined oxygen in the dissolved sugars, acids and other organic oxygen compounds is converted to water and carbon dioxide by dehydroxylation and decarboxylation. At the same time, the suspended organic solids in the sludge are coked and converted to a non-septic solid.

Aqueous liquid substantially free from suspended solids is withdrawn from the coking drum through line 27. Gas released during the coking process is discharged from coking drum 26 through relief valve 30 while grease separated from the liquid in the coking drum 26 is withdrawn through line 32 as controlled by control valve 33. Coke, or solid carbonized material, settles from the aqueous liquid and collects in the lower part of the coke drum 26 from which it is discharged as an aqueous slurry, continuously or periodically, through line 34 to separator 35 as controlled by line 36.

Steam and gases released from the coke-containing effluent in separator 35 are discharged through line 37 to a suitable gas disposal system. Coke, substantially water free, is discharged from the separator 35 through line 38. A suitable filter or centrifuge for removal from solid coke may be incorporated in separator 35. Aqueous liquid is withdrawn from the separator by pump 39 through line 41 and combined with water from coke drum 26 in line 27. The combined aqueous streams from lines 27 and 41 are treated for removal of residual organic compounds by oxidation with air in an oxidizer 42. Oxidizer 42 suitably comprises a tubular reaction coil. Air required for the oxidization step is introduced into the oxidizer 42 through line 43, the air suitably being introduced into contact with the liquid line 27.

Generally the air oxidation reaction step is conducted under approximately the same temperature and pressure conditions as the coking process carried out in heater 24 and coke drum 26, i.e. at a temperature in the range of 400 to 700° F. and at a pressure in the range of 300 to 3500 p.s.i.g. Preferred temperatures in reaction zone 42 are within the range of 400 to 600° F. at a pressure in excess of the vapor pressure of water under the conditions prevailing in the reactor, i.e. in the range of 700 to 1600 p.s.i.g.

The amount of air required for reaction with residual organic material in the aqueous effluent of the coking zone and a solid separation system 36 is determined by the effectiveness of the coking process and the final chemical oxygen demand (COD) or biochemical oxygen demand (BOD) required for the waste water. In general, 10 to 100 grams of air per liter of aqueous charge is sufficient for the cleanup of dissolved organic compounds in the aqueous effluents of the coking process as described herein. The time required for the air oxidation reaction is generally within the range of 0.1 minute to 10 minutes. The water leaving reactor 42 is passed through heat exchanger 23 where it is cooled to a temperature in the range of 150 to 200° F. and discharged through pressure relief valve 44 and line 46 to waste water disposal through line 12.

In the following examples, and throughout the specification, the term "chemical oxygen demand," abbreviated "COD," is used in the usual sense. Thus COD denotes the total oxidizable material present in the liquid under consideration regardless of whether or not it is biodegradable. BOD tests, on the other hand, denote the amount of oxygen consumed during a five day period of bacterial activity at 20° C. on a chemically standardized and stabilized sample. Although COD is not strictly comparable to the biological oxygen demand (BOD), it is believed sufficiently useful as an indication of reduction of BOD to provide a basis for comparison of the effectiveness of alternate methods of treatment, particularly when applied to comparable waste samples.

EXAMPLES 1-3

Raw sewage sludge from the primary settler of the municipal sewage plant at Beacon, N.Y., were collected on various days and treated in accordance with the process of this invention under the conditions and with the results indicated in the following tables. Average characterization tests on the raw sewage sludge were as follows:

Raw sewage sludge

| | G./l. |
|---|---|
| COD | 60 |
| Residue on evaporation | 50 |
| Total volatiles | 33 |
| Fixed residue | 17 |

Coking stage

| | Example No. | | |
|---|---|---|---|
| | 1 | 2 | 3 |
| Operating conditions: | | | |
| Temperature, °F | 450 | 550 | 600 |
| Pressure, p.s.i.g | 475 | 1,100 | 1,575 |
| Time, hours | 2 | 2 | 2 |

Product tests

| | 1 | 2 | 3 |
|---|---|---|---|
| Dry coke: | | | |
| Weight percent of charge | 1.57 | 1.60 | 1.11 |
| Analysis, weight percent: | | | |
| Carbon | 42.5 | 24.6 | 53.3 |
| Hydrogen | 5.3 | | |
| Nitrogen | 1.9 | 1.3 | 2.5 |
| Sulfur | 0.4 | | 0.4 |
| Phosphorus | 0.9 | | 0.8 |
| Ash | 32.7 | 64.0 | 36.0 |
| Grease: | | | |
| Weight percent of charge | None | 0.13 | 0.43 |
| Carbon, weight percent | | 47.0 | 72.0 |

Air oxidation stage

Aqueous liquid effluents from the above runs, after separation of coke and grease therefrom, were subjected to oxidation with air in a bomb under the conditions and with the results shown in the following tabulation.

| Example No | 1 | 2 | 3 |
|---|---|---|---|
| Operating Conditions: | | | |
| Temperature, °F | 450 | 550 | 600 |
| Pressure, p.s.i.g | 450 | 1,200 | 1,500 |
| Oxygen, g./l | ¹ 34.7 | ² 21 | ³ 35.6 |
| Time, hrs | ¹ 4 | ² 4 | ³ 10 |
| Treated Liquid: | | | |
| Residue on Evaporation, g./l | | 13.90 | 4.27 |
| Total Volatiles, g./l | | 6.92 | 2.18 |
| Fixed Residue, g./l | | 6.98 | 2.09 |
| COD, g./l | 2.18 | 4.6 | 2.18 |
| pH | 2.4 | 4 | |
| Appearance | (⁴)(⁵) | | (⁴)(⁵) |

¹ Two 2-hour oxidation periods using 13.9 and 20.8 g. O₂/l. respectively.
² Two 2-hour oxidation periods using 7 and 14 g./l. respectively.
³ Five 2-hour periods using 0.4, 6.4, 6.4, 6.4 and 16 g./l., respectively, using chrome steel mesh as catalyst.
⁴ Off-shade.
⁵ Water white.

EXAMPLE 1A

Treated liquid from Example 1 was further treated by the addition of hydrate of lime sufficient to raise the pH to 7.5. A green precipitate settled from the solution. Results of the lime treatment are shown in the following tables.

| Lime Treated Liquid | | Solid Precipitate |
|---|---|---|
| Ca(OH)₂, g./l | 6.25 | Spectrometric Analysis: Major= |
| pH | 7.5 | Calcium; Minor=Nickel, Iron; |
| Color | (¹) | Trace=Silicon, Manganese. |
| Odor | None | |
| Residue on Evaporation, wt. percent | 11.3 | |
| Total Volatiles, wt. percent | 4.3 | |
| Fixed Residue | 7.0 | |
| COD, g./l | 1.4 | |

¹ Water-white.

EXAMPLE 2A

Aqueous liquid effluent from the coking step of Example 2 was subjected to air oxidation at 550° F. and 1200 p.s.i.g. in a bomb containing chrome steel mesh as catalyst in two 2-hour oxidation periods using 7 and 14 g./l. of oxygen, respectively. The final treated liquid product had a COD of 1.99 g./l.

EXAMPLES 4–15

A series of runs were made in which the heat treatments of sewage sludge from the primary settler of the municipal sewage plant at Beacon, N.Y., were carried out under varying conditions of time and temperature. In these runs, the sewage sludge was treated in stainless steel tubes immersed in high tin alloy metal bath. The operating conditions and results are shown in the following tables. Runs for Examples 4–11 were carried out in ¾ inch diameter tubes, and runs for Examples 12–15 were carried out in 5/16 inch diameter tubes.

| Example | 4 | 5 | 6 | 7 |
|---|---|---|---|---|
| Temperature, °F | 500 | 500 | 500 | 500 |
| Time at 500° F., minutes [1] | 1 | 10 | 20 | 60 |
| Coke, wt. percent of charge | 3.4 | 3.8 | 2.8 | 3.9 |
| Liquid product, COD, g./l | 9.83 | 10.6 | 12.6 | 17.2 |

[1] 3.5 minutes were required to heat charge to operating temperature.

| Example | 8 | 9 | 10 | 11 |
|---|---|---|---|---|
| Temperature, °F | 545 | 545 | 545 | 545 |
| Time at 545° F., minutes [1] | 1 | 10 | 20 | 60 |
| Coke, wt. percent of charge | 2.5 | 2.0 | 3.0 | 2.5 |
| Liquid product, COD, g./l | 12.0 | 13.0 | 13.6 | 11.2 |

[1] 3.5 minutes were required to heat charge to operating temperature.

| Example | 12 | 13 | 14 | 15 |
|---|---|---|---|---|
| Temperature, °F | 600 | 600 | 600 | 600 |
| Time at 600° F., minutes | 1 | 5 | 10 | 20 |
| Coke, wt. percent of charge | 2.0 | 2.2 | 2.7 | 2.9 |
| Liquid product, COD, g./l | 13.9 | 13.0 | 11.0 | 11.7 |

EXAMPLES 16–35

Biological sludge from the treatment of refinery waste streams by an activated sludge process at the Puget Sound refinery of Texaco Inc. at Anacortes, Wash., was treated in accordance with the process of this invention. The sludge, as received, had a characteristic gray, slime appearance and could not be filtered by laboratory vacuum filtration apparatus. This sludge was subjected to coking in stainless steel tubes immersed in a high tin alloy metal bath under the conditions and with the results shown in the following tables.

Biological sludge

| | |
|---|---|
| Residue on evaporation, g./l. | 60.8 |
| Total volatiles, g./l. | 39.7 |
| Fixed residue, g./l. | 21.1 |
| pH | 6.9 |
| COD, g./l. | 67 | is passed to a high pressure separator. Coke is continuously withdrawn to a blowdown tank where essentially all the water is evaporated and a dry coke is secured. The treated, coke-free, liquid from the settler is mixed with air and fed to the fired tubular oxidation reactor. The air to liquid ratio is maintained such that a slight excess of oxygen compared with the stoichiometric requirements of the liquid as measured by COD, is maintained. Thus, in the present example the COD of the product liquid averaged 16,000 mg./l. (16 grams per liter) during a typical week of operation and 66.4 pounds of air was introduced per minute into the product liquid supplied to the tubular oxidation reactor. The residence time in the tube is about one minute at an average temperature of 520° F. The oxidized liquid effluent product has an average COD of 4100 mg./l. Wet coke is recovered at the rate of 82 pounds per minute or, on a dry basis, 62 pounds per minute. The essential analytical tests are as follows:

| | Charge | Oxidize Liquid | Coke (Dried at 220° F.) |
|---|---|---|---|
| COD, grams oxygen per liter | 67.0 | 4.1 | |
| Carbon, weight percent | | | 41.2 |
| Sulfur, weight percent | | | 1.2 |
| Nitrogen, weight percent | | | 2.8 |
| Phosphorus, weight percent | | | 1.6 |
| Silicon, weight percent | | | 7.3 |

The terms "Residue on Evaporation," "Total Volatile," and "Fixed Residue," as used herein are well known in the art, cf. "Standard Methods for Examination of Water, Sewage and Industrial Wastes," 10th ed., American Public Health Association, New York, 1955. Residue on Evaporation is determined by the sample to 103° C. in an evaporation dish. Fixed Residue is determined by heating the above residue to 600° C. in an evaporating dish. Total Volatile is the difference between Residue on Evaporation and Fixed Residue.

We claim:

1. A process for the treatment of biological sewage sludge containing dissolved and suspended organic matter which comprises heat treating said sludge in a coking zone at an elevated temperature in the range of 400 to 700° F. under a pressure above the vapor pressure of water at said elevated temperature effecting conversion of said organic matter to carbonized non-septic solid, separating solid carbonized material from resulting treated aqueous effluent, withdrawing treated aqueous effluent from said heating zone, contacting said treated aqueous effluent at an elevated temperature and pressure within the ranges above stated with air in an amount effective for further reduction of organic content of said treated aqueous effluent and yielding a sterile aqueous liquid effluent having a relatively low chemical oxygen demand (COD), and recovering aqueous liquid of reduced organic ma-

| Example | 16 | 17 | 18 | 19 | 20 | 21 | 22 | 23 | 24 | 25 | 26 | 27 | 28 | 29 | 30 | 31 | 32 | 33 | 34 | 35 |
|---|---|---|---|---|---|---|---|---|---|---|---|---|---|---|---|---|---|---|---|---|
| Tube diameter, inch [1] | ¾ | ¾ | ¾ | ¾ | ¾ | ¾ | ¾ | ¾ | ¾ | ¾ | ¾ | ¾ | ¾ | ¾ | ¾ | ¾ | ¾ | ¾ | 5/16 | 5/16 |
| Temperature, °F | 470 | 475 | 470 | 470 | 470 | 475 | 500 | 500 | 500 | 500 | 500 | 500 | 550 | 550 | 550 | 550 | 550 | 550 | 600 | 625 |
| Pressure, p.s.i.g. | | | | | | | | | | | | | | | | | | | 1,650 | 1,850 |
| Time, minutes [2] | 0.1 | 1 | 5 | 10 | 30 | 60 | 0.1 | 1 | 5 | 10 | 30 | 60 | 0.1 | 1 | 5 | 10 | 30 | 60 | 1 | 1 |
| Coke, wt. percent of charge | 2.7 | 2.9 | 3.1 | 3.1 | 3.7 | 4.3 | 2.7 | 3.1 | 2.7 | 2.5 | 2.4 | 2.4 | 2.4 | 2.0 | 2.4 | 2.5 | 2.1 | 2.7 | 2.3 | 2.0 |
| Liquid COD, g./l | 19.1 | 20.2 | 18.0 | 18.5 | 21.1 | 21.7 | 23.1 | 22.3 | 19.7 | 26.4 | 27.1 | 21.3 | 22.8 | 21.4 | 17.7 | 19.5 | 20.5 | 15.8 | 17.5 | 16.5 |

[1] Nominal internal diameter.
[2] Time reported indicates duration of treatment at indicated operating termperature: (3.5 minutes were required to heat charge to operating temperature).

EXAMPLE 36

Activated biological slude from an oil refinery is processed in accordance with the procedure described herein. In one week of operation, an average of 107 gallons of sludge per minute is processed. The sludge is passed in heat exchange with hot product liquid waste and then fed to a fired tube heater. The flow pattern is such that turbulent flow is achieved in the tubular heater and the sludge has a residence time of about one minute at temperatures in the range of 480–530° F. The coked liquid terial content and low COD as a disposable product of the process.

2. A process according to claim 1 wherein said heat treatment is carried out at a pressure within the range of 300 to 3500 p.s.i.g.

3. A process according to claim 1 wherein the average residence time of said sewage sludge in said heat treatment zone is within the range of 0.5 minute to 2 hours and wherein the average residence time of said aqueous liquid effluent from said heat treatment zone is retained in said oxidation zone for a period of time within the range of 0.1 minute to ten minutes.

4. A process according to claim 1 wherein said biological sewage sludge is sludge from a municipal sewage treatment plant.

5. A process according to claim 1 wherein said raw sewage is an oil refinery biological sludge.

References Cited

UNITED STATES PATENTS

| | | | |
|---|---|---|---|
| 3,060,118 | 10/1962 | Schoeffel | 210—63 X |
| 3,155,611 | 11/1964 | Porteous | 210—71 X |
| 3,275,547 | 9/1966 | Bucksteeg et al. | 210—18 X |

FOREIGN PATENTS 851,416  10/1960  Great Britain.

MICHAEL E. ROGERS, Primary Examiner

U.S. Cl. X.R.

210—71